(12) United States Patent
Chevalier et al.

(10) Patent No.: US 11,556,645 B2
(45) Date of Patent: Jan. 17, 2023

(54) MONITORING CONTROL-FLOW INTEGRITY

(71) Applicant: HEWLETT-PACKARD DEVELOPMENT COMPANY, L.P., Spring, TX (US)

(72) Inventors: Ronny Chevalier, Meudon (FR); Guillaume Hiet, Cesson-Sevigne (FR); Maugan Villatel, Bristol (GB); David Plaquin, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 126 days.

(21) Appl. No.: 16/077,688

(22) PCT Filed: Jun. 6, 2018

(86) PCT No.: PCT/US2018/036236
§ 371 (c)(1),
(2) Date: Aug. 13, 2018

(87) PCT Pub. No.: WO2018/226814
PCT Pub. Date: Dec. 13, 2018

(65) Prior Publication Data
US 2021/0182393 A1    Jun. 17, 2021

(30) Foreign Application Priority Data
Jun. 7, 2017  (EP) .................................... 17305674

(51) Int. Cl.
*G06F 21/56* (2013.01)
*G06F 17/18* (2006.01)
*G06F 21/55* (2013.01)

(52) U.S. Cl.
CPC ............ *G06F 21/566* (2013.01); *G06F 17/18* (2013.01); *G06F 21/554* (2013.01); *G06F 21/563* (2013.01)

(58) Field of Classification Search
CPC .................... G06F 21/50–567; G06F 17/18
See application file for complete search history.

(56) References Cited

U.S. PATENT DOCUMENTS

| | | | |
|---|---|---|---|
| 4,419,728 A * | 12/1983 | Larson | G06F 15/167 710/305 |
| 6,938,124 B2 | 8/2005 | Rust et al. | |

(Continued)

FOREIGN PATENT DOCUMENTS

WO    WO-2016048288 A1 *    3/2016    ............ G06F 11/302

OTHER PUBLICATIONS

Van der Veen, Victor, et al. "Practical context-sensitive CFI." Proceedings of the 22nd ACM SIGSAC Conference on Computer and Communications Security. 2015. (Year: 2015).*

(Continued)

*Primary Examiner* — Madhuri R Herzog
(74) *Attorney, Agent, or Firm* — Knobbe, Martens, Olson & Bear, LLP

(57) ABSTRACT

A method for monitoring control-flow integrity in a low-level execution environment, the method comprising receiving, at a monitor, a message from the execution environment indicating that the execution environment has entered a controlled mode of operation, receiving, at the monitor, a data packet representing execution of a selected portion of a control-flow process at the execution environment, identifying, using the data packet, a pathway corresponding to the selected portion of the control-flow process from a set of (Continued)

permissible control-flow pathways and determining whether the identified pathway corresponds to an expected control-flow behaviour.

16 Claims, 5 Drawing Sheets

(56) References Cited

U.S. PATENT DOCUMENTS

| | | | |
|---|---|---|---|
| 7,434,085 | B2 | 10/2008 | Ramirez |
| 8,155,134 | B2 | 4/2012 | Fairhurst et al. |
| 8,275,982 | B2 | 9/2012 | Vyssotski et al. |
| 9,063,836 | B2 | 6/2015 | Swanson et al. |
| 9,223,983 | B2 | 12/2015 | Dong et al. |
| 9,537,738 | B2 | 1/2017 | Delgado et al. |
| 2002/0091826 | A1 | 7/2002 | Comeau et al. |
| 2005/0010804 | A1* | 1/2005 | Bruening ............... G06F 21/52 726/1 |
| 2012/0297057 | A1* | 11/2012 | Ghosh ................ H04L 63/1441 709/224 |
| 2013/0160028 | A1 | 6/2013 | Black |
| 2013/0283245 | A1 | 10/2013 | Black |
| 2013/0340077 | A1 | 12/2013 | Salsamendi et al. |
| 2014/0082327 | A1 | 3/2014 | Ghose |
| 2014/0325239 | A1* | 10/2014 | Ghose .................. G06F 9/3851 713/190 |
| 2015/0040130 | A1 | 2/2015 | Ali et al. |
| 2016/0191550 | A1 | 6/2016 | Ismael et al. |
| 2017/0090929 | A1 | 3/2017 | Muttik |

OTHER PUBLICATIONS

Xu, Haizhi, Wenliang Du, and Steve J. Chapin. "Context sensitive anomaly monitoring of process control flow to detect mimicry attacks and impossible paths." International Workshop on Recent Advances in Intrusion Detection. Springer, Berlin, Heidelberg, 2004. (Year: 2004).*

Butterworth, John, et al. "Bios chronomancy: Fixing the core root of trust for measurement." Proceedings of the 2013 ACM SIGSAC conference on Computer & Communications Security. 2013. (Year: 2013).*

Leach, Kevin, et al. "Towards transparent introspection." 2016 IEEE 23rd International Conference on Software Analysis, Evolution, and Reengineering (SANER). vol. 1. IEEE, 2016. (Year: 2016).*

Petroni Jr, Nick L., and Michael Hicks. "Automated detection of persistent kernel control-flow attacks." Proceedings of the 14th ACM conference on Computer and communications security. 2007. (Year: 2007).*

Kovah et al., "SENTER Sandman: Using Intel TXT to Attack BIOSes", Retrieved from Internet: https://conference.hitb.org/hitbsecconf2014kul/wp-content/uploads/2014/08/HITB2014KUL-SENTER-Sandman.pdf, 2008, 5 Pages.

Nurmukhametov et al., "Application of Compiler Transformations Against Software Vulnerabilities Exploitation", ISSN 0361-7688, Programming and Computer Software, vol. 41, No. 4, 2015, pp. 231-236.

Patel et al., "Ensuring Secure Program Execution in Multiprocessor Embedded Systems: A Case Study", 5th IEEE/ACM/IFIP International Conference on Hardware/Software Codesign and System Synthesis (CODES+ISSS), 2007, pp. 57-62.

Tygar et al., "Using Secure Coprocessors", Retrieved from Internet: http://citeseerx.ist.psu.edu/viewdoc/download?doi=10.1.1.28.4872&rep=rep1&type=pdf, 1994, 104 Pages.

* cited by examiner

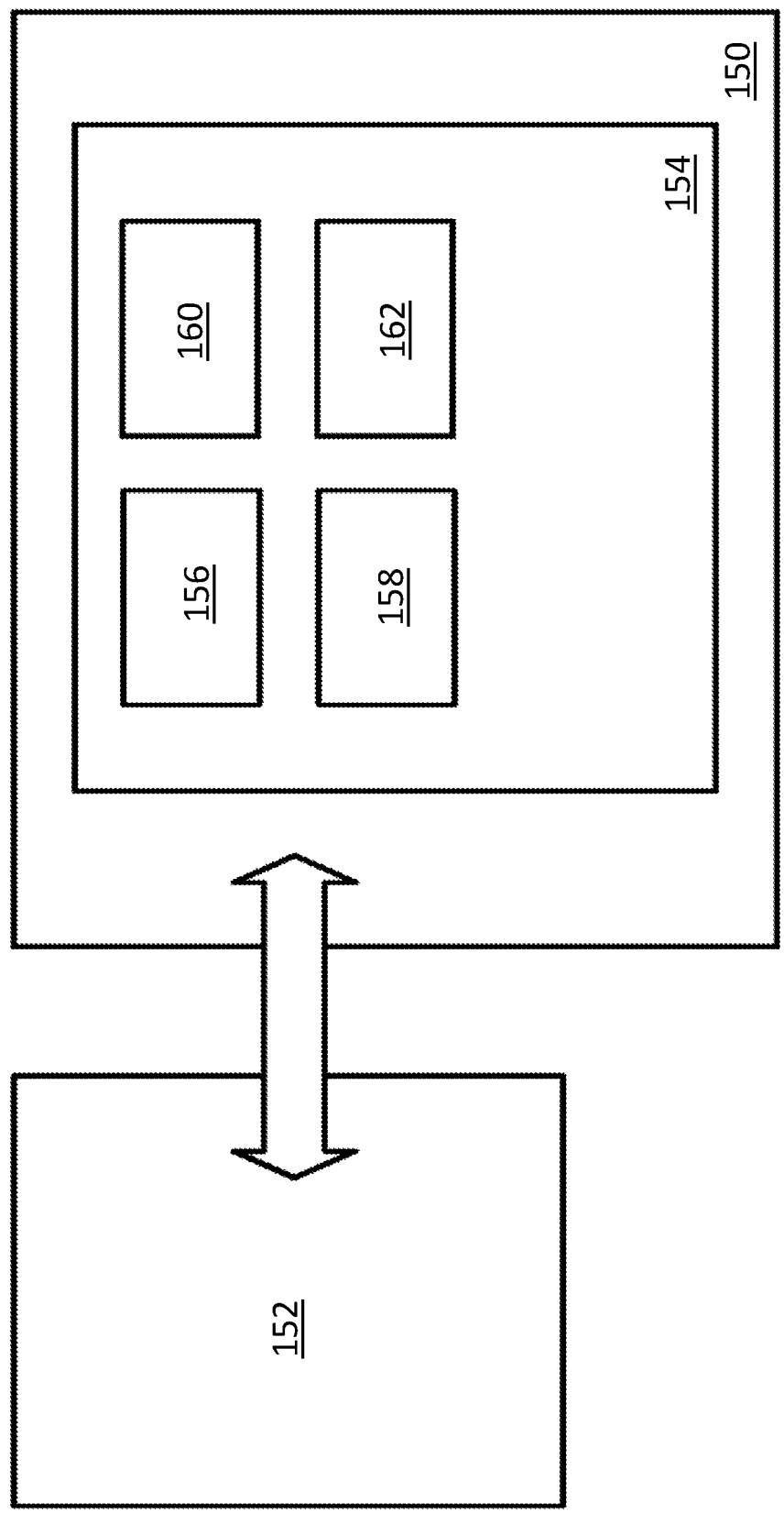

MONITORING CONTROL-FLOW INTEGRITY

BACKGROUND

Low-level execution environments such as the kernel of an Operating System (OS), a hypervisor in a virtualised system or firmware have direct access to system hardware and are highly privileged. Alteration to their expected behaviour, malicious or not, can have undesirable consequences for the confidentiality, integrity or availability of the system in the question.

BRIEF DESCRIPTION OF THE DRAWINGS

Various features of certain examples will be apparent from the detailed description which follows, taken in conjunction with the accompanying drawings, which together illustrate, by way of example only, a number of features, and wherein:

FIG. 5 is a schematic representation of a processor associated with a memory according to an example.

DETAILED DESCRIPTION

Figure 1:
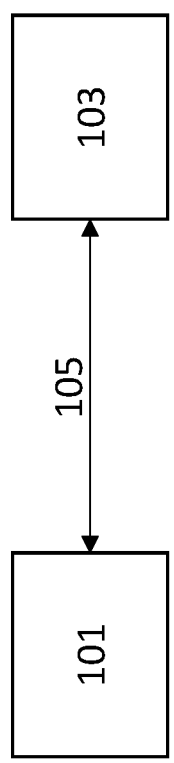
FIG. 1 is a schematic representation of an intrusion detection system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In an execution environment, such as a computing device or a virtual system, boot firmware, such as the Basic Input/Output System (BIOS) or Unified Extensible Firmware Interface (UEFI) compliant firmware, are used to test and initialise hardware components before transferring execution to an OS.

In a virtualised system, in which one or more virtual machines (VMs) may be instantiated over physical hardware, a hypervisor or virtual machine monitor (VMM) is used to apportion hardware access and present and manage the execution of an OS to VMs.

Arbitrary instructions executed in one of these low-level execution environments, which changes its original expected behaviour (such as skipping a verification step), can compromise subsequent parts of the system. Accordingly, tampering with these environments is appealing for attackers who may try to infect them with malware. Due to the nature of these environments and their early execution, such malware can become persistent, hard to detect and remove, and be independent of an OS.

On x86 instruction set systems (which are based on a family of backward-compatible instruction set architectures) for example, a highly privileged execution mode of the CPU, the System Management Mode (SMM), can modify the system flash which contains the boot firmware. Use of the SMM can prevent a compromised operating system infecting the system firmware.

More specifically, during an initial system boot process, and before executing the system OS, the boot firmware can load instructions into so-called System Management RAM (SMRAM). These instructions correspond to privileged functions to be executed in SMM. The firmware can the lock the SMRAM and the flash (using hardware features) to prevent any modification from the OS.

It is also possible to use cryptographic signatures during a boot process and an update process so that firmware signed by a vendors key are executed. In addition, measurements (cryptographic hash) of components and configurations of the boot process can be computed and stored at boot time to attest to the integrity of the platform.

While cryptographic signatures and measurements provide integrity at boot time, they do not preclude an attacker exploiting a vulnerability in the SMM, for example, at runtime of the system. Accordingly, if an attacker manages to execute malicious instructions in the SMM or another low-level execution environment, it can create malware that is undetectable to an OS.

According to an example, there is provided an intrusion detection system (IDS) to detect intrusions that modify the expected behaviour of a low-level execution environment at runtime. The IDS can be used to monitor the integrity of the SMM at runtime, and may be used to monitor a kernel or VMM or other low-level execution environment.

Part of the system uses a monitor to receive messages from a target forming a monitored component of a system. In an example, the monitor is isolated from the monitored component by using a co-processor, which is a structurally separate device. An IDS according to an example leverages a communication channel that enables the target to send information to bridge a semantic gap between the monitor and the target.

FIG. 1 is a schematic representation of an intrusion detection system according to an example. A monitor 101 can receive messages from a target 103 over a low-latency communication link 105. In an example, monitor 101 can be a co-processor, and is a trusted component that is used to detect intrusions in the system. Any alteration to the normal behaviour of the host system does not affect the integrity of the monitor.

The isolation offered by the monitor 101 implies a loss in knowledge of the context in which instructions executed in the target 103. Without the full context, there can be a semantic gap between what the target's actual behaviour is, and what the monitor 101 can infer. For example, there may be a shortfall of knowledge of a virtual to physical address mapping, or an execution path taken. According to an example, the communication channel 105 between the monitor 101 and the target 103 enables the target 103 to send information to the monitor 101 in order to narrow the semantic gap for the monitor 101.

According to an example, the following properties are presented:

Data integrity—If a message is sent to the monitor, it may not be removed or modified afterwards. Otherwise, if an attacker compromised the target it could modify or remove a message before being processed to hide its intrusion.

Chronological order—Messages are processed at the monitor in the order of their emission from the target otherwise an attacker could rearrange the order to evade the detection depending on the detection approach.

Access—When the target is executing, no other component has access to the communication channel. Otherwise, an attacker could send messages faking a legitimate behaviour. That is, the target has privileged access to the communication channel or the monitor can reliably identify the source of the messages as being the target.

Low latency—Sending a message should be fast (e.g., sub-microsecond) so that low-level components can minimize the time spent performing their task to avoid impacting the user space applications.

According to an example, communication from the target 103 to the monitor 101 can be enabled using instrumentation during compilation of the instructions to be executed on the low-level execution environment under consideration (i.e. the target). Such instrumentation can, for example, operate at the compiler level or by rewriting binary if it does not have access to a set of source instructions.

According to an example, instrumentation can fetch information at runtime from the target at a location known at compile time. Control flow integrity (CFI) is an example of such instrumentation where the compiler can instrument binary instructions without recourse to a developer. A further instrumentation according to an example can be an ad hoc approach that uses manual modification of source instructions of the target or that can provide other information such as annotations. For example, x86 control registers, like CR3, can change the behaviour of a system if an attacker can modify their value. The expected value of the registers is known, as is the case when a modification is legitimate. Thus, an instrumented portion of instructions can be used to send the value of these registers to the monitor.

Figure 2:
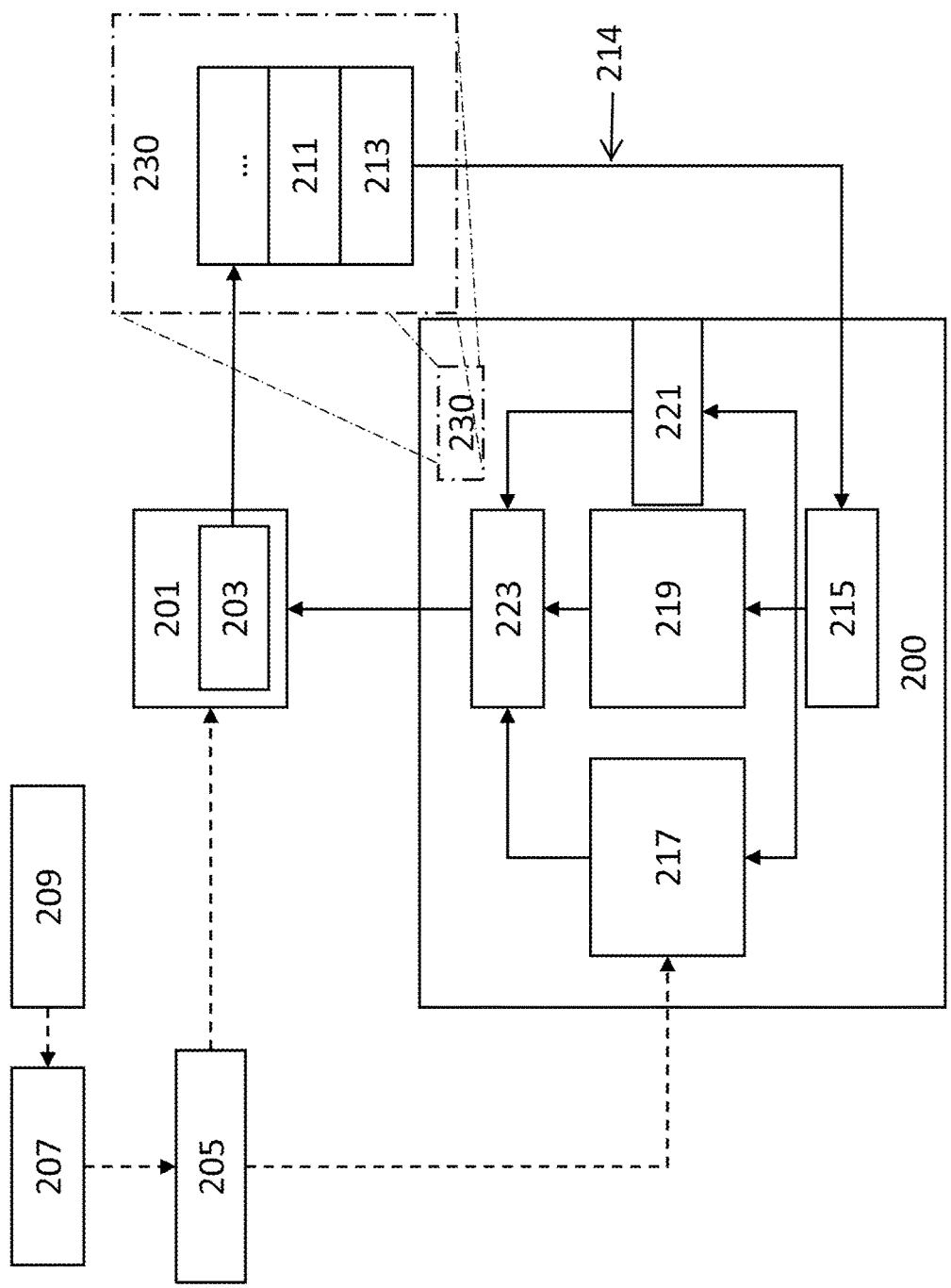
FIG. 2 is a schematic representation of an intrusion detection system according to an example.

FIG. 2 is a schematic representation of an intrusion detection system according to an example. Monitor 200 can receive messages 211, 213, . . . and so on from a target 201 over a low-latency communication link 214.

According to an example, monitor 200 can be a co-processor that can be used as security processor to perform sensitive tasks and handle sensitive data (e.g., cryptographic keys). The main processor of a system does not directly access the security processor memory. Thus, it cannot access sensitive data, but can query the co-processor to perform tasks via a communication channel.

The latency of a communication channel, link or pathway can impact the latency of System Management Interrupt (SMI) handlers for each message sent from a target to the monitor. An acceptable latency can be of the order of 150 μs. Fast and frequent SMIs cause a degradation of performance (I/O throughput or CPU time). On the other hand, long and infrequent SMIs cause a user experience degradation, where audio playback using a USB device is considered unresponsive by the driver, and a severe drop in frame rates in game engines can occur for example.

Therefore, according to an example, a controlled access memory structure 230 can be logically positioned between the target and the monitor using point-to-point interconnects in order to enable a low-latency communication path between a target and monitor. In an example, the memory structure may form part of the target, part of the monitor or be a separate component so that a co-processor can be used as monitor without modification. In this connection therefore, logical positioning refers to the memory structure being configured to receive data from a target and send data to (or have the data pulled from) a monitor and does not preclude the structure from being formed within or as part of a target or monitor or being a separate component in a system. Other components may physically lie in between a target and monitor.

In an example, the memory structure can use a restricted access First In First Out (FIFO) queue that allows the target to push and the monitor to pop messages. In an example, the FIFO can receive messages fragmented in packets. The FIFO can store messages sent by the target that are awaiting processing by the monitor.

In an example, the memory structure 230 can handle a write pointer. Thus, an attacker does not control it and does not have access to its memory and cannot therefore violate the integrity of the messages. The monitored component (target) 201 has a mapping between a physical address and the memory structure 230. At the beginning of each SMI, the target 201 or the monitor 230 can ensure that the target has a mapping to communicate with the monitor in order to avoid other devices communicating with it while in SMM and to avoid remapping attacks. A system as depicted in FIG. 2 fulfils the data integrity property mentioned above since the target does not have direct access to the monitor memory, it can push messages and if the queue is full it does not wrap over. It fulfils the chronological order property because there is no concurrent access to it while in SMM. Moreover, it fulfils the exclusive access property since one core is active while in SMM and no other device can communicate with the monitor. Finally, for the last property regarding the low latency, a fast interconnect, such as a point-to-point interconnect, between the main processor executing the monitored component and the monitor can be used. The interconnect used depends on the CPU manufacturer. In x86 architectures, for example, a QuickPath (QPI) or Hyper-Transport interconnect can be used. These interconnects are used for inter-core or inter-processor communication and are specifically designed for low latency.

Referring to FIG. 2, instructions executing in the firmware 203 of a target 201 are pushed as packets 211, 213 to the memory structure 230 of the monitor 200. Monitor 200 can fetch messages from the structure 230 at block 215. Initially, the memory structure 230 can receive a message from the target 201 indicating that the target 201 has entered or is in a controlled mode of operation, such as SMM for example. That is, in order for the monitor 200 to ensure that when the target 201 is executing, it has exclusive access to the communication link 214, the target 201 can use an extra signal to notify the monitor 200 that it has entered the execution mode for the low-level instructions. For example, with ARM TrustZone the Non-Secure bit (NS-bit) can be used to differentiate whether the processor is currently executing low-level instructions in the secure world or not. On an x86 architecture, the monitor 200 can also determine when the processor is executing in SMM by using a signal available at the chipset level. Additionally, any logical signalling that can be trusted by the monitor (such as by using virtual wires, cryptographically authenticated signals, etc.) can be used to notify the monitor of the execution of the low-level instructions.

Thus, a data integrity property is respected since the target 201 does not have direct access to the monitor memory structure 230. It can push messages and if the queue is full it does not wrap over. In an example, structure 230 can fulfil the chronological order property because it is in the form of a FIFO queue and there is no concurrent access to it while the target is executing. The queue can be in the form of a linear or circular array in which messages are processed in the order in which they are received.

Messages fetched from memory structure 230 are processed by the monitor to determine if there is any deviation from an expected behaviour at the target 201. For example, the messages can be compared with a list, map or graph of expected behaviour to determine the presence of deviations (223) in indirect calls handling (217), shadow stack calls (219) and other suitable behaviours (221).

According to an example, communication from the target 201 to the monitor 200 can be implemented by adding an instrumentation process during, for example, compilation. The instrumentation can operate at the compiler level or by rewriting the binary if it does not have access to a set of source instructions 207. One property for the instrumentation is to have instruction integrity during boot time and runtime. Otherwise, an attacker could overwrite the instrumentation to either replace it entirely with nop instructions (i.e., instructions which do nothing) or replace the data sent to be always valid.

Instruction integrity at boot time is possible thanks to the use of cryptographic signatures and measurements. At runtime, it is considered that the instruction cannot be modified, which is possible with the use of page tables with write protection enabled as noted.

In an example, instrumentation can be applied to an instruction set automatically and can be used to fetch information at runtime from the target at a location known at compile time. CFI is an example of such instrumentation where the compiler can automatically instrument binary instructions. A second instrumentation can be in the form of an ad hoc approach that uses manual modification of source instructions of the target or to provide other information such as annotations. As such, relevant information which will help the monitor to gain a better understanding of the behaviour of the target can be determined.

Therefore, according to an example, instrumentation to modify instructions, such as SMM instructions for example, can be twofold: (1) automatic instrumentation 205 to send CFI related information; and (2) manual instrumentation 209 to send information regarding x86 specific variables. In an example, mov instructions can be used to send packets to the monitor.

In an example, LLVM, which is a compilation framework, can be used to automatically instrument instructions, such as SMM instructions. Two LLVM passes can be performed. The first pass can be used to enable backward-edge CFI (i.e., a shadow call stack) and can instrument binary instructions so as to send a message containing a return address on the stack to the monitor at an epilogue and one at a prologue of a function. A second pass can be used to enable forward-edge CFI (i.e., to determine that an indirect call is calling a valid target). In an example, for each indirect call site, a unique identifier (UID) can be assigned, and a mapping between the identifier and the type signature of the function called can be created.

Each indirect call site can be instrumented to send the identifier and the function pointer to the monitor before executing the indirect call. Then, for each function whose type signature is in the set of types called indirectly or declared as an external function, a mapping between the function offset in memory and its type can be added. This final mapping provides the functions that could be called indirectly with their type signature and offset in memory.

Therefore, according to an example, at the end of the build process, there are two pieces of information: a mapping between an identifier and a type, and a mapping between an offset and the type of the function at that location. However, such information may not be enough for the monitor to have the mapping at runtime. It has the functions offset but not their final address in memory or a base address of where instructions used for SMM are loaded in memory. In an example, this can be provided to the monitor by manually instrumenting the firmware instructions to send the address during the initialization (before the SMRAM is locked). This way, at boot time, the monitor can determine the final mapping by adding the offset to the corresponding base address.

Figure 3:
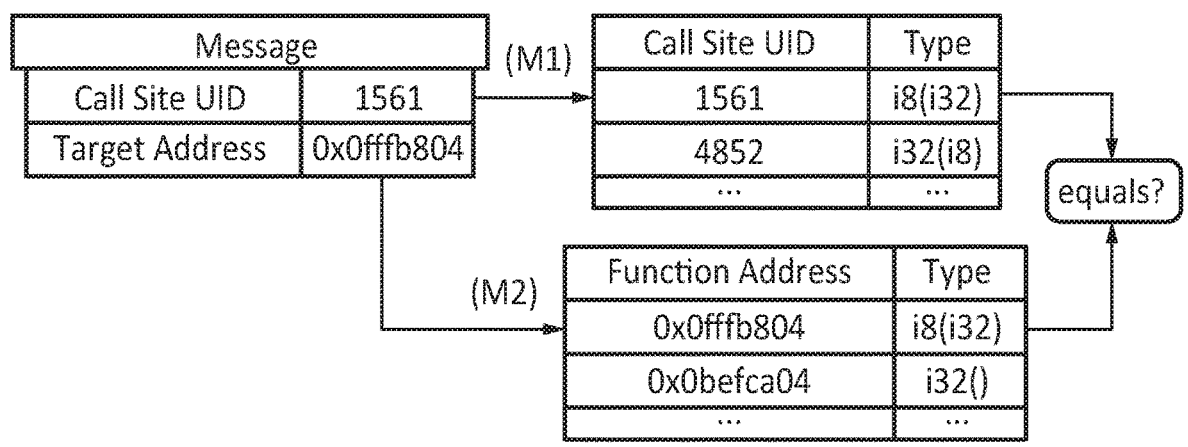
FIG. 3 is a schematic representation of mappings used to verify indirect call messages according to an example.

FIG. 3 is a schematic representation of mappings used to verify indirect call messages according to an example. As shown in FIG. 3, the monitor has two mappings: (M1), a mapping between the identifier of a call site and its expected type; and (M2), a mapping between the address of a function and its type. The monitor verifies that the target address received in a message (that can be controlled by the attacker) has the expected type according to the call site UID from the same message (that cannot be controlled by the attacker).

According to an example, after instrumenting the SMM instruction for CFI, instructions to send the current value of variables specific to the x86 architecture at the end of each SMI can be manually instrumented. These variables, such as SMBASE or CR3, could be modified by an attacker to take control of the SMM or evade detection. When entering SMM, the main CPU stores its context in a save state area, and restores it when exiting. The location of the SMRAM, called the SMBASE, is saved in the save state area. The processor uses the SMBASE every time an SMI is triggered to jump to the SMM entry point. Hence, it is possible for an SMI handler to modify the SMBASE in the save state area, and the next time an SMI is triggered, the processor will use the new SMBASE. Such behaviour is genuine at boot time to relocate the SMRAM to another location in RAM (e.g., in multi-processor systems the SMBASE should be different for each processor). At runtime, however, there is no valid reason to do this. Thus, in an example, the SMBASE value can be sent to the monitor at the end of each SMI to detect any malicious modification of this value. For this, the expected SMBASE value can be registered at boot time with the monitor. If the value registered and the value received when exiting SMM diverge the monitor can raise an alert. In addition, the integrity of MMU-related registers, like CR3 (i.e., an x86 register holding the physical address of the page directory), which could be exploited by an attacker can be ensured. Such registers are reset at the beginning of each SMI with a known value from a variable in memory. An expected value of these variables can be registered at boot time to ensure their integrity like the SMBASE.

Therefore, according to an example, at compile time, two phases are added to a compilation of instructions. The first phase derives the expected behaviour of the set of instructions regarding its control flow via a static analysis. That is, according to an example, a graph or set of pathways and/or links and/or mappings can be generated. The graph represents a set of permissible control-flow pathways that can be executed by a low-level execution environment. It therefore provides a map of expected behaviours when any one of a number of portions of a control-flow process is executed. Thus, for a given portion, one can determine the permissible pathways that can be taken. A deviation from any expected behaviour can therefore be a sign that there is malicious activity.

The second phase, (instrumentation), can automatically inject instructions so that a target executing the set of instrumented instructions can send information to the monitor.

For example, at boot time, a BIOS can send the two following pieces of information to the monitor:
    the pre-computed expected behaviour generated during compile time,
    a memory mapping of the SMM instructions determined during the boot.

At runtime, the SMM can execute its original set of instructions which has been instrumented to send messages regarding its control flow. In parallel, the monitor can process these messages and detect a compromise by looking for any discrepancy between the expected behaviour and the monitored behaviour.

Thus, according to an example, at runtime, the actual behaviour of the target can be compared to the expected behaviour in order to determine if there is any deviation. An executed instrumented portion of the control-flow process can therefore trigger the transmission of a data packet indicating execution of the portion of the control-flow process at the execution environment. Using the data packet, a pathway corresponding to the selected portion of the control-flow process can be identified from the set of permissible control-flow pathways, and from there it can be determining whether the identified pathway corresponds to an expected control-flow behaviour.

In an example, a legal or permissible behaviour can be the non-tampering of the return address of a function call. An instrumented set of instructions according to an example can send the return address of a function call (stored on the stack) to the monitor both when it enters and leaves a function. The monitor can compare the two and determine whether there has been a tampering of the return address on the stack.

In another example, a legal or permissible behaviour can be the non-tampering of indirect calls. Instrumented instructions according to an example can be used to send a message before each indirect call to the monitor containing the address of the function being called. Then, the monitor can determine that this address is a valid function and has a type consistent with the static analysis phase (i.e., the pre-computed expected behaviour).

According to an example, target 201 can be a hypervisor of a virtualised system or a kernel of an OS. Monitor 200 can be virtual machine. That is, the virtual machine can be instantiated over physical hardware allocated in a virtualised system using a hypervisor forming the monitored component for example. The virtual machine can comprise a secure execution environment inaccessible to other components of the virtualised system.

Figure 4:
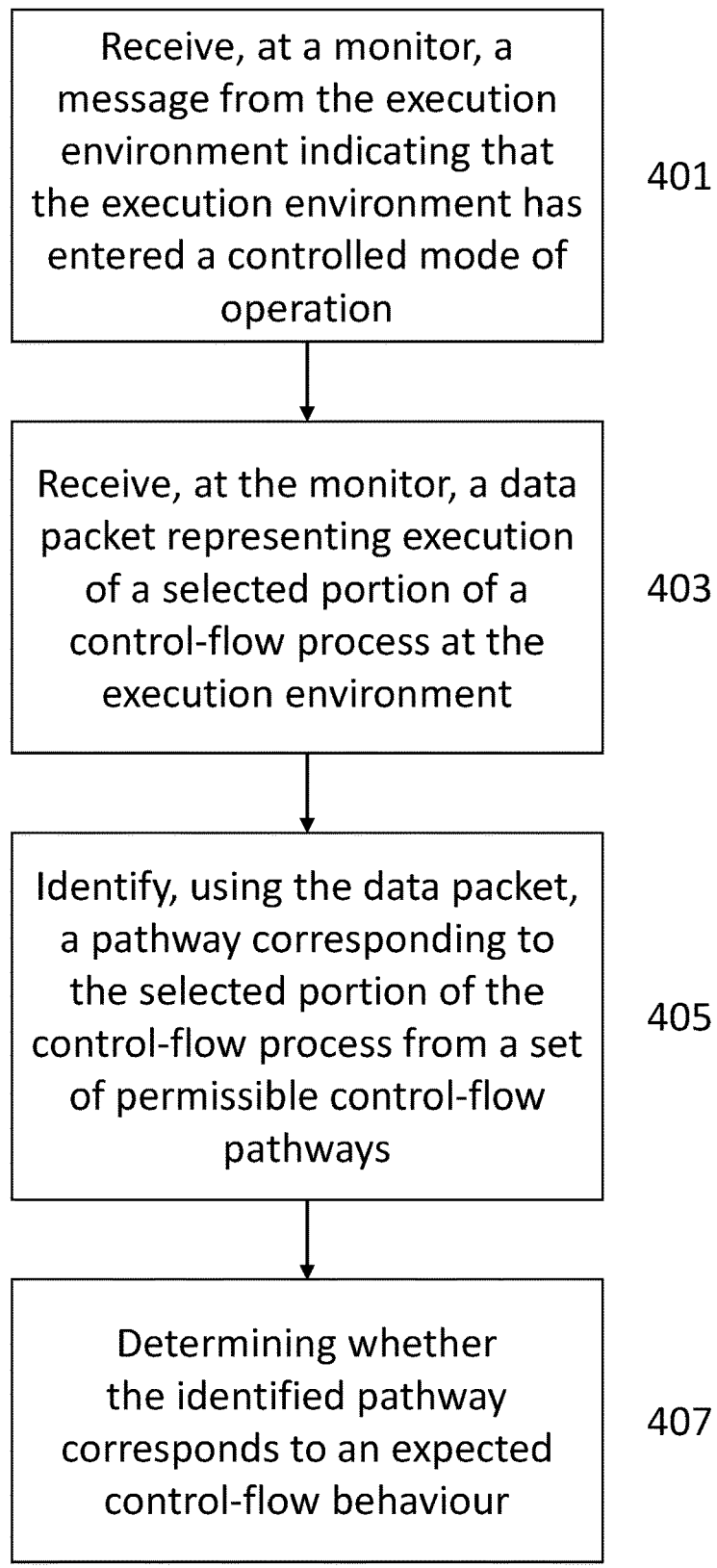
FIG. 4 is a flow chart of a method according to an example.

FIG. 4 is a flow chart of a method according to an example. In block 401 a message from an execution environment indicating that the execution environment has entered a controlled mode of operation is received at a monitor. In block 403 a data packet representing execution of a selected portion of a control-flow process at the execution environment is received at the monitor. In block 405 a pathway corresponding to the selected portion of the control-flow process is identified (using the data packet) from a set of permissible control-flow pathways. In block 407 it is determined whether the identified pathway corresponds to an expected control-flow behaviour.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program instructions therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, monitor 200) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

FIG. 5 shows an example of a processor 150 associated with a memory 152. The memory 152 comprises computer readable instructions 154 which are executable by the processor 150. The instructions 154 comprise:

Instructions 156 to receive messages from a monitored component over a low-latency communication link;

Instructions 158 to receive a message from a target indicating that the target has entered a controlled mode of operation;

Instructions 160 to fetch a message from a memory structure of a monitor; and Instructions 162 to compare a message to an expected control flow operation.

Such machine-readable Instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for monitoring control-flow integrity in a low-level execution environment in a system, the method comprising:
   during compilation of target instructions to be executed;
      deriving an expected control-flow behavior that comprises generating a graph that represents a set of permissible control-flow pathways executable by the low-level execution environment;
      adding information sending instructions to the target instructions, to produce modified target instructions;
   at boot time of the system, sending, by a Basic Input/Output System (BIOS) to a monitor, the graph;
   at runtime of the system:
      receiving, at the monitor, a message from the modified target instructions executing in the low-level execution environment, the message indicating that the low-level execution environment has entered a System Management Mode (SMM);
      receiving, at the monitor, a data packet representing execution of a selected portion of a control-flow process at the low-level execution environment in the SMM, the data packet pushed into a queue by a target that executes the control-flow process, wherein a concurrent access of the queue is not performed in the SMM, and the target has exclusive access of the queue in the SMM;
      identifying, using the data packet, a pathway corresponding to the selected portion of the control-flow process from the set of permissible control-flow pathways; and
      determining whether the identified pathway corresponds to the expected control-flow behavior, based on comparing information derived from the data packet to the graph.

2. The method of claim 1, wherein the adding of the information sending instructions to the target instructions comprises modifying the target instructions in binary form.

3. The method of claim 1, wherein the adding of the information sending instructions to the target instructions comprises modifying the target instructions in source form.

4. The method of claim 1, further comprising:
   instrumenting a set of instructions for execution in the SMM; and
   executing first and second instrumentation passes of the set of instructions to respectively administer backward-edge and forward-edge control-flow integrity.

5. The method of claim 1, wherein the compilation of the target instructions is performed by a compiler that adds the information sending instructions to the target instructions.

6. A non-transitory machine-readable storage medium encoded with machine-readable instructions executable on a processor, the machine-readable instructions upon execution causing a system to:
   during compilation of target instructions to be executed:
      derive an expected control-flow behavior that comprises generating a graph that represents a set of permissible control-flow pathways executable by a low-level execution environment of the system;
      add information sending instructions to the target instructions, to produce modified target instructions;
   at boot time of the system, send the graph from a Basic Input/Output System (BIOS) to a monitor;
   at runtime of the system:
      receive, at the monitor, a message from the modified target instructions executing in the low-level execution environment, the message indicating that the low-level execution environment has entered a System Management Mode (SMM);
      receive, at the monitor, a data packet representing execution of a selected portion of a control-flow process at the low-level execution environment in the SMM, the data packet pushed into a queue by a target that executes the control-flow process, wherein the data packet cannot be modified after being pushed into the queue, a concurrent access of the queue is not performed in the SMM, and the target has exclusive access of the queue in the SMM;
      identify, using the data packet, a pathway corresponding to the selected portion of the control-flow process from the set of permissible control-flow pathways; and
      determine whether the identified pathway corresponds to the expected control-flow behavior, based on comparing information derived from the data packet to the graph.

7. The non-transitory machine-readable storage medium of claim 6, wherein the machine-readable instructions upon execution cause the system to detect a compromise in the low-level execution environment by determining a presence of a discrepancy between the expected control-flow behavior and a monitored control-flow behavior.

8. The non-transitory machine-readable storage medium of claim 6, wherein the machine-readable instructions upon execution cause the system to:
   receive, at the monitor during the boot time of the system, expected location information of a System Management RAM (SMRAM);
   receive, at the monitor in association with a System Management Interrupt (SMI), location information of the SMRAM; and
   compare, by the monitor, the location information of the SMRAM to the expected location information of the SMRAM received by the monitor during the boot time of the system, to detect malicious modification of the location information of the SMRAM.

9. The non-transitory machine-readable storage medium of claim 6, wherein the low-level execution environment comprises a hypervisor.

10. The non-transitory machine-readable storage medium of claim 6, wherein the machine-readable instructions upon execution cause the system to compare a return address of a function call when the target enters a function and a return address when the target leaves the function to determine whether there is a tampering of a return address on a system stack.

11. The non-transitory machine-readable storage medium of claim 10, wherein the machine-readable instructions upon execution cause the system to:
   receive a message before an indirect call containing an address of the function being called; and
   verify that the address of the function being called corresponds to a valid function and has a type consistent with the expected control-flow behavior.

12. A system comprising:

a processor;

a non-transitory storage medium storing instructions executable on the processor to:

during compilation of target instructions to be executed:

derive an expected control-flow behavior that comprises generating a graph that represents a set of permissible control-flow pathways executable by a low-level execution environment of the system;

add, information sending instructions to the target instructions, to produce modified target instructions;

at boot time of the system, send the graph from a Basic Input/Output System (BIOS) to a monitor;

at runtime of the system:

receive, at the monitor, a message from the modified target instructions executing in the low-level execution environment, the message indicating that the low-level execution environment has entered a System Management Mode (SMM);

receive, at the monitor, a data packet representing execution of a selected portion of a control-flow process at the low-level execution environment in the SMM, the data packet pushed into a queue by a target that executes the control-flow process, wherein a concurrent access of the queue is not performed in the SMM, and the target has exclusive access of the queue in the SMM;

identify, using the data packet, a pathway corresponding to the selected portion of the control-flow process from the set of permissible control-flow pathways; and determine whether the identified pathway corresponds to the expected control-flow behavior, based on comparing information derived from the data packet to the graph.

13. The system of claim 12, wherein the low-level execution environment comprises a hypervisor.

14. The method of claim 1, wherein the low-level execution environment comprises a hypervisor.

15. The method of claim 1, further comprising:

receiving, at the monitor during the boot time of the system, expected location information of a System Management RAM (SMRAM);

receiving, at the monitor in association with a System Management Interrupt (SMI), location information of the SMRAM; and comparing, by the monitor, the location information of the SMRAM to the expected location information of the SMRAM received by the monitor during the boot time of the system, to detect malicious modification of the location information of the SMRAM.

16. The system of claim 12, wherein the instructions are executable on the processor to:

receive, at the monitor during the boot time of the system, an expected location information of a System Management RAM (SMRAM);

receive, at the monitor in association with a System Management Interrupt (SMI), location information of the SMRAM; and compare, by the monitor, the location information of the SMRAM to the expected location information of the SMRAM received by the monitor during the boot time of the system, to detect malicious modification of the location information of the SMRAM.

* * * * *